(12) United States Patent
Kumar et al.

(10) Patent No.: US 8,371,233 B2
(45) Date of Patent: Feb. 12, 2013

(54) SYSTEM AND METHOD FOR DYNAMICALLY AFFECTING A FORCE APPLIED THROUGH A RAIL VEHICLE AXLE

(75) Inventors: Ajith Kuttannair Kumar, Erie, PA (US); Bret Dwayne Worden, Union City, PA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/869,980

(22) Filed: Aug. 27, 2010

(65) Prior Publication Data

US 2010/0319568 A1 Dec. 23, 2010

Related U.S. Application Data

(63) Continuation of application No. 11/871,730, filed on Oct. 12, 2007, now abandoned.

(51) Int. Cl.
- B61C 15/04 (2006.01)
- B61C 15/06 (2006.01)
- B61C 15/14 (2006.01)

(52) U.S. Cl. .......................... 105/75; 105/73
(58) Field of Classification Search .................. 105/73, 105/75, 82, 195, 209
See application file for complete search history.

(56) References Cited

U.S. PATENT DOCUMENTS

| | | | |
|---|---|---|---|
| 8,166 A | 6/1851 | Griggs | |
| 2,709,968 A | 6/1955 | Cox | |
| 3,908,559 A | 9/1975 | Fromm | |
| 4,294,175 A | 10/1981 | Harsy | |
| 4,337,706 A | 7/1982 | Loosli | |
| 4,359,716 A | 11/1982 | Miyamaru et al. | |
| 4,787,318 A | 11/1988 | Vogel | |
| 4,793,047 A | 12/1988 | Curtis et al. | |
| 5,103,740 A * | 4/1992 | Masse | 105/72.2 |
| 5,193,063 A | 3/1993 | Assh | |
| 5,373,121 A * | 12/1994 | Nagel | 187/275 |
| 5,610,372 A | 3/1997 | Phillips et al. | |
| 5,732,787 A | 3/1998 | Hirahara et al. | |
| 5,841,254 A | 11/1998 | Balch et al. | |
| 5,877,455 A | 3/1999 | Kyrtsos | |

(Continued)

FOREIGN PATENT DOCUMENTS

| | | |
|---|---|---|
| DE | 1035681 | 8/1958 |
| EP | 0779194 A1 | 6/1997 |

(Continued)

OTHER PUBLICATIONS

Form PCT/ISA/210.PCT International Search Report for PCT/US2008/079540 for General Electric Company. Date of mailing Jan. 23, 2009.

(Continued)

*Primary Examiner* — S. Joseph Morano
*Assistant Examiner* — Zachary Kuhfuss
(74) *Attorney, Agent, or Firm* — GE Global Patent Operation; John A. Kramer

(57) ABSTRACT

A system is provided for dynamically affecting a force applied through at least one axle of a rail vehicle configured to travel along a rail track. The rail vehicle includes a plurality of axles and a plurality of wheels received by the plurality of axles. The system includes a device configured to selectively impart the force through the at least one axle to control a respective weight of the at least one axle on the rail track for affecting a traction performance of the rail vehicle traveling along the rail track.

21 Claims, 9 Drawing Sheets

U.S. PATENT DOCUMENTS

| | | | |
|---|---|---|---|
| 5,986,220 A | 11/1999 | Nakazaki | |
| 6,163,121 A | 12/2000 | Kumar et al. | |
| 6,167,357 A | 12/2000 | Zhu et al. | |
| 6,267,062 B1 | 7/2001 | Hamilton, Jr. | |
| 6,279,486 B1 | 8/2001 | Boichot | |
| 6,598,538 B2 | 7/2003 | Semple et al. | |
| 6,828,746 B2 | 12/2004 | Kumar | |
| 6,984,946 B2 | 1/2006 | Donnelly et al. | |
| 7,027,900 B2 * | 4/2006 | Kumar et al. | 701/19 |
| 7,124,691 B2 | 10/2006 | Donnelly et al. | |
| 7,302,895 B2 | 12/2007 | Kumar et al. | |
| 7,421,954 B2 | 9/2008 | Bose | |
| 2002/0077733 A1 | 6/2002 | Bidaud | |
| 2002/0179345 A1 | 12/2002 | Bell | |
| 2005/0251299 A1 | 11/2005 | Donnelly et al. | |
| 2009/0031915 A1 | 2/2009 | Kumar et al. | |
| 2009/0031916 A1 | 2/2009 | Kumar et al. | |
| 2009/0031917 A1 | 2/2009 | Kumar et al. | |
| 2009/0095194 A1 | 4/2009 | Kumar et al. | |
| 2009/0095195 A1 | 4/2009 | Kumar et al. | |
| 2009/0095196 A1 | 4/2009 | Kumar et al. | |
| 2009/0095197 A1 | 4/2009 | Kumar et al. | |

FOREIGN PATENT DOCUMENTS

| | | |
|---|---|---|
| FR | 1289653 | 2/1962 |
| GB | 1116012 | 6/1968 |
| WO | 9713653 | 4/1997 |

OTHER PUBLICATIONS

Form PCT/ISA/237. PCT Written Opinion of the International Searching Authority for PCT/US2008/079540 for General Electric Company. Date of mailing Jan. 23, 2009.

Kumar, Ajith Kuttannair et al., "System and Method for Dynamically Determining a Force Applied Through a Rail Vehicle Axle," U.S. Appl. No. 11/871,753, filed Oct. 12, 2007, 45 pages.

* cited by examiner

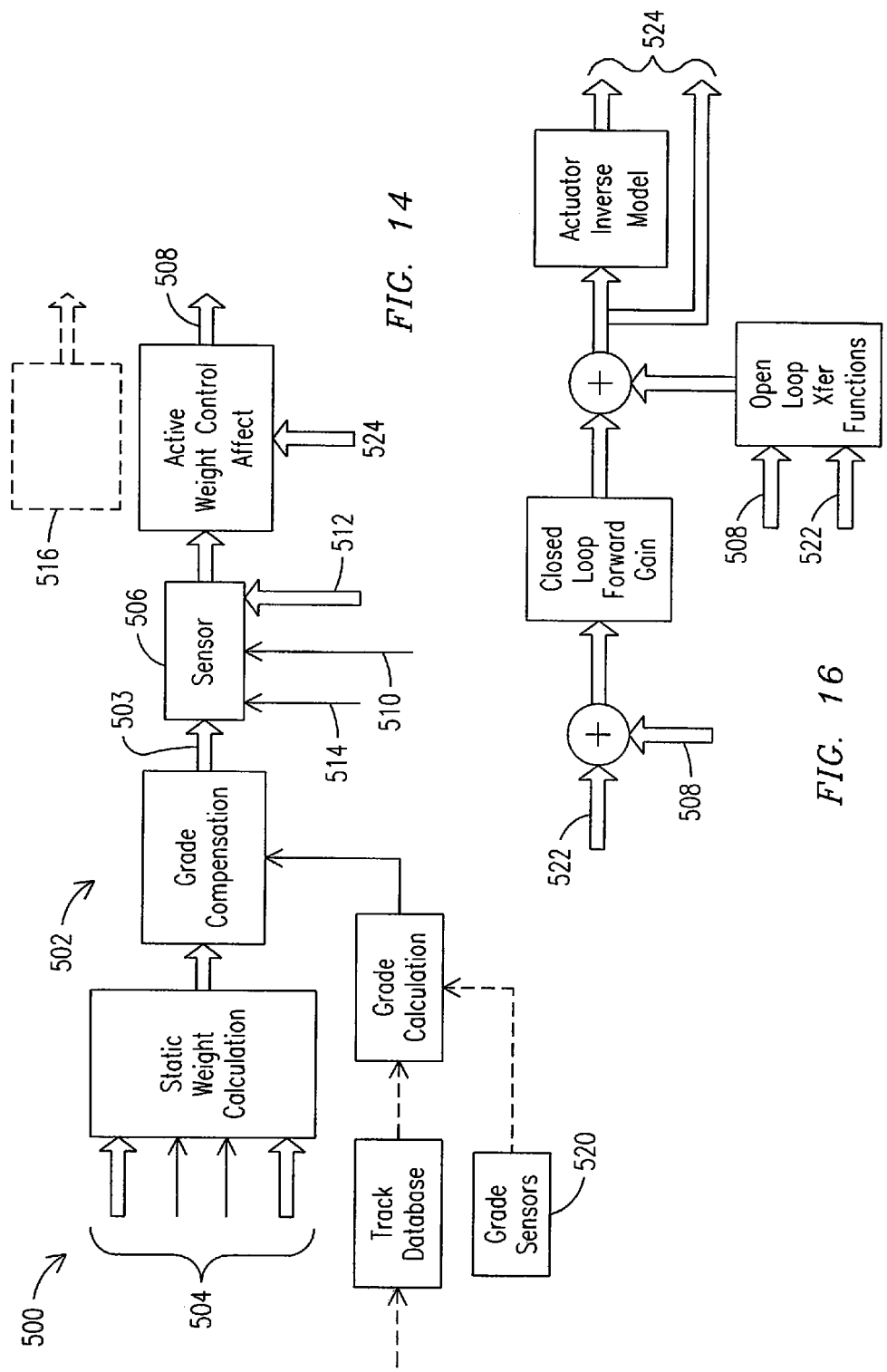

SYSTEM AND METHOD FOR DYNAMICALLY AFFECTING A FORCE APPLIED THROUGH A RAIL VEHICLE AXLE

This is a continuation of prior U.S. patent application Ser. No. 11/871,730, filed 12 Oct. 2007 now abandoned.

BACKGROUND OF THE INVENTION

Embodiments of the subject matter herein relate to rail vehicles. Other embodiments relate to rail vehicle trucks.

A diesel-electric locomotive typically includes a diesel internal combustion engine coupled to drive a rotor of at least one traction alternator to produce alternating current (AC) electrical power. The traction alternator may be electrically coupled to power one or more electric traction motors mechanically coupled to apply torque to one or more axles of the locomotive. The traction motors may include AC motors operable with AC power, or direct current motors operable with direct current (DC) power. For DC motor operation, a rectifier may be provided to convert the AC power produced by the traction alternator to DC power for powering the DC motors.

AC-motor-equipped locomotives typically exhibit better performance and have higher reliability and lower maintenance than DC motor equipped locomotives. In addition, more responsive individual motor control may be provided in AC-motor-equipped locomotives, for example, via use of inverter-based motor control. However, DC-motor-equipped locomotives are relatively less expensive than comparable AC-motor-equipped locomotives. Thus, for certain hauling applications, such as when hauling relatively light freight and/or relatively short trains, it may be more cost efficient to use a DC-motor-equipped locomotive instead of an AC-motor-equipped locomotive.

For relatively heavy hauling applications, diesel-electric locomotives are typically configured to have two trucks including three axles per truck, where the three axles include one or more powered axles and one or more non-powered axles. Each powered axle of the truck is typically coupled, via a gear set, to a respective motor mounted in the truck near the axle. Each axle is mounted to the truck via a suspension assembly that typically includes one or more springs for transferring a respective portion of a locomotive weight (including a locomotive body weight and a locomotive truck weight) to the axle while allowing some degree of movement of the axle relative to the truck.

A locomotive body weight is typically configured to be about equally distributed between the two trucks. The locomotive weight is usually further configured to be symmetrically distributed among the axles of the trucks. For example, a conventional locomotive weighing 420,000 pounds is typically configured to equally distribute weight to the six axles of the locomotive, so that each axle supports a force of 420,000/6 pounds per axle, or 70,000 pounds per axle.

Locomotives are typically manufactured to distribute weight symmetrically to the trucks and then to the axles of the trucks so that relatively equal portions of the weight of the locomotive are distributed to the axles. Typically, the weight of the locomotive and the adhesion capability of the locomotive determine a tractive effort capability rating of the locomotive. Accordingly, the weight applied to each of the powered axles times the amount of friction or adhesion that can be developed to the powered axle determines a tractive effort capability of the corresponding powered axle. Consequently, the heavier a locomotive, the more tractive effort that it can generate. Additional weight, or ballast, may be added to a locomotive to bring it up to a desired overall weight for achieving a desired tractive effort capability. For example, due to manufacturing tolerances that may result in varying overall weights among locomotives built to a same specification, locomotives are commonly configured to be slightly lighter than required to meet a desired tractive effort capability, and then ballast is added to reach a desired overall weight capable of meeting the desired tractive effort rating. In conventional locomotive systems, the weight distribution among the powered axles and non-powered axles is statically adjusted prior to shipment, and is not capable of being dynamically adjusted once the locomotive trip has begun.

Accordingly, a locomotive system is needed that may be used to dynamically affect a force applied through a locomotive powered axle or a locomotive non-powered axle of a locomotive truck, so to dynamically adjust a weight distribution among the powered axle(s) and non-powered axle(s).

BRIEF DESCRIPTION OF THE INVENTION

One embodiment of the present invention provides a system for dynamically affecting a force applied through at least one axle of a rail vehicle configured to travel along a rail track. The rail vehicle includes a plurality of axles and a plurality of wheels received by the plurality of axles. The system includes a device configured to selectively impart the force through the at least one axle to control a respective weight of the at least one axle on the rail track for affecting a traction performance of the rail vehicle traveling along the rail track.

Another embodiment of the present invention provides a method for dynamically affecting a force applied through at least one axle of a rail vehicle configured to travel along a rail track. The rail vehicle includes a plurality of axles and a plurality of wheels being received by the plurality of axles. The method includes configuring a device to selectively impart the force through the at least one axle to control a respective weight of the at least one axle on the rail track for affecting a traction performance of the rail vehicle traveling along the rail track.

BRIEF DESCRIPTION OF THE DRAWINGS

A more particular description of the invention briefly described above will be rendered by reference to specific embodiments thereof that are illustrated in the appended drawings. These drawings depict only typical embodiments of the invention and are not therefore to be considered to be limiting of its scope.

FIG. 14 is a schematic view of an exemplary embodiment of a system for determining a force applied through a plurality of locomotive axles in a locomotive configured to travel along a rail track;

FIG. 16 is a schematic view of an exemplary embodiment of a system for determining a force applied through a plurality of locomotive axles in a locomotive configured to travel along a rail track.

DETAILED DESCRIPTION OF THE INVENTION

Figure 1:
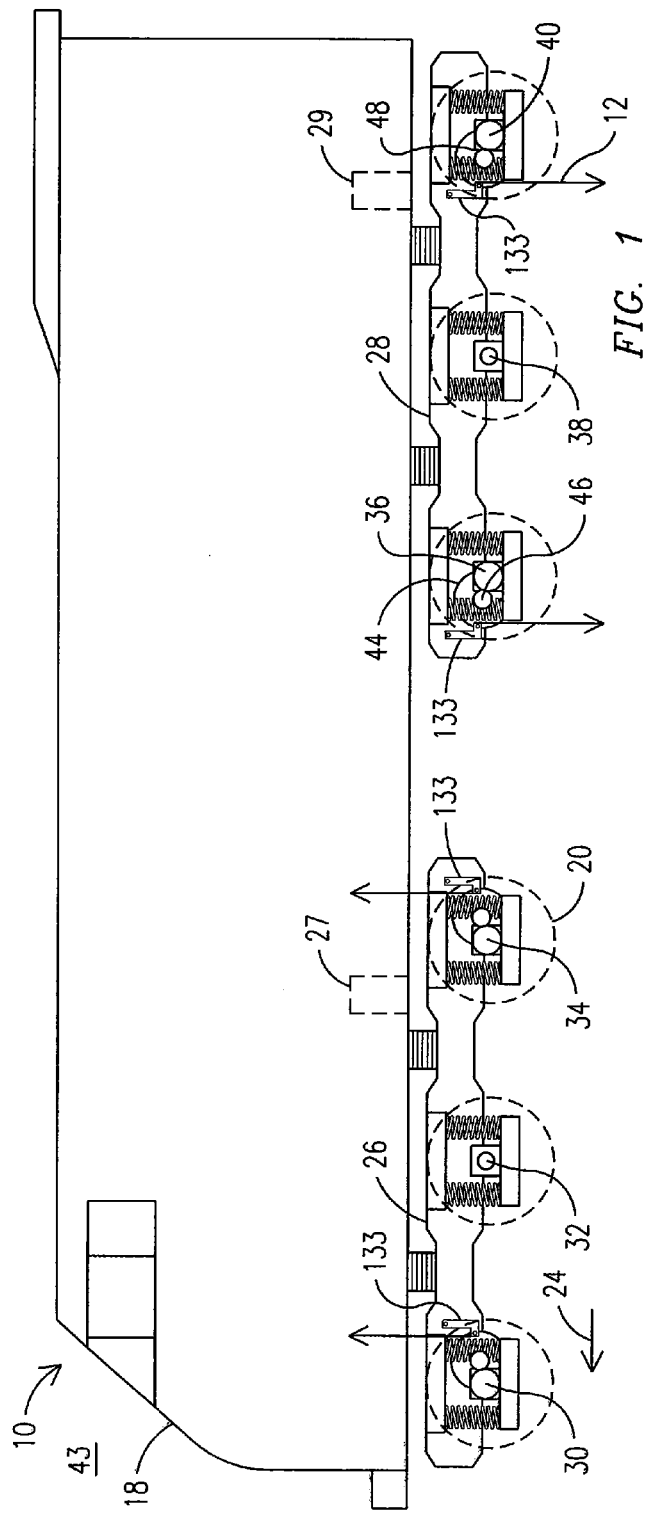
FIG. 1 is a side view of an exemplary embodiment of a conventional locomotive with a pair of trucks in a reverse alignment.

Reference will now be made in detail to the embodiments consistent with the invention, examples of which are illustrated in the accompanying drawings. Wherever possible, the same reference numerals are used throughout the drawings and refer to the same or like parts.

FIG. 1 illustrates an exemplary embodiment of a system 10 for dynamically affecting a normal force 12 applied through one or more of a plurality of locomotive axles 30, 32, 34, 36, 38, 40. Although FIG. 1 illustrates a locomotive 18, the embodiment of the system 10 of the present invention, and all embodiments of the present invention discussed below, may be utilized with any rail vehicle, including a locomotive, for example. The locomotive 18 illustrated in FIG. 1 is configured to travel along a rail track (not shown), and includes a plurality of locomotive wheels 20 which are each received by a respective axle 30, 32, 34, 36, 38, 40. The plurality of wheels 20 received by each axle 30, 32, 34, 36, 38, 40 are configured to move along a respective rail of the rail track in a travel direction 24.

Figure 2:
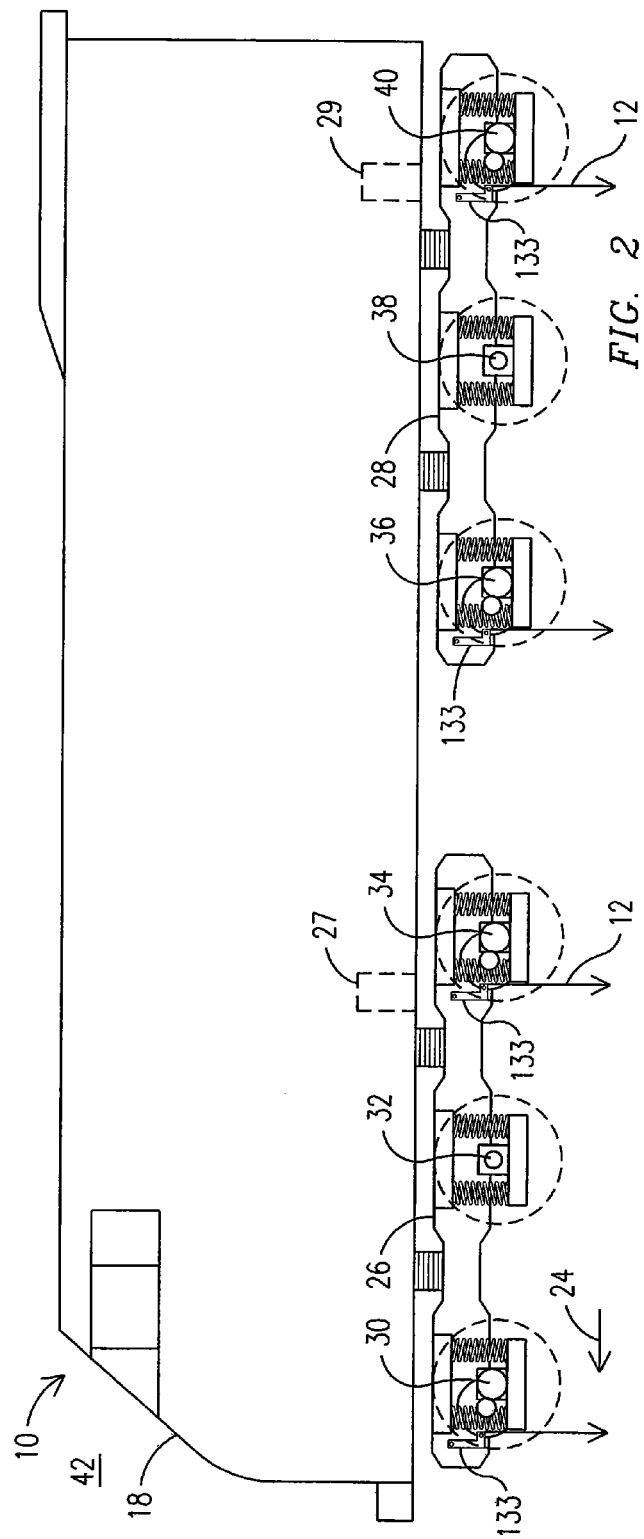
FIG. 2 is a side view of an exemplary embodiment of a system for dynamically affecting a normal force applied through a locomotive axle of a locomotive with a pair of trucks in a common alignment.

As illustrated in the exemplary embodiment of FIG. 1, the locomotive 18 includes a pair of rotatable trucks 26, 28 which are configured to receive a respective plurality of axles (30, 32, 34) (36, 38, 40). The pair of rotatable trucks 26, 28 are configured to be rotated from an opposite alignment 43 (FIG. 1) to a common alignment 42 (FIG. 2) with respect to the travel direction 24, such that the common alignment 42 of the trucks 26, 28 is configured to enhance the traction performance of the locomotive 18 as the locomotive travels along the rail track. Each rotatable truck 26, 28 includes a pair of spaced powered axles (30, 34) (36, 40) and a non-powered axle (32) (38) positioned between the pair of spaced powered axles. The powered axles (30, 34) (36, 40) are respectively coupled to a traction motor 44 and a gear 46. The combination of the respective powered axle (30, 34) (36, 40) and respective traction motor 44 may be referred to as the "combo," and a stationary (i.e., non-rotating) component of the "combo" is coupled to the respective truck 26, 28 using a reaction member 133, as illustrated in FIGS. 1-4. In an exemplary embodiment of the present invention, the reaction member 133 may take an "L-shaped" form. The reaction member 133 couples the stationary component of the "combo" to the respective truck 26, 28 frame to exert a vertical force which displaces the "combo" relative to the truck 26, 28 frame in the vertical direction. The direction of the vertical force is upward or downward, depending on the direction 24 of the tractive effort. In the exemplary embodiment of the opposite alignment 43 illustrated in FIG. 1, the respective gear 46 of a pair of powered axles 30, 34 for one of the trucks 26 are positioned on an opposite side of the powered axles 30, 34, relative to the direction of travel 24, thereby causing an upward force on the powered axles 30, 34 and reducing the tractive effort of the locomotive 18. In stark contrast, the exemplary embodiment of the common alignment 42 illustrated in FIG. 2 illustrates the respective gear 46 of all powered axles 30, 34, 36, 40 for all trucks 26, 28 positioned on the same relative side 48 of the powered axles 30, 34, 36, 40 as the direction of travel 24, thereby causing a downward force 12 on the powered axles 30, 34, 36, 40, and increasing the tractive effort of the locomotive 18.

Upon rotating the trucks 26, 28 to the common alignment 42, the weight imparted by the powered axles (30, 34) (36, 40) on the rail track increases, while the weight imparted by the non-powered axles (32) (38) on the rail track decreases, as compared to the respective values in the opposite alignment 43 arrangement. Although FIGS. 1-2 illustrate a pair of spaced apart powered axles and a non-powered axle positioned therebetween within each truck, the trucks 26, 28 may include any number of powered axles and at least one non-powered axle, within any positional arrangement. The trucks 26, 28 may be rotated by removing the locomotive 18 from the rail track and rotating the trucks 26, 28 about a traction pin (not shown), for example, before repositioning the locomotive 18 on the rail track with the trucks 26, 28 in the new relative alignment.

Although the system 10 increases the traction performance of the locomotive 18 by rotating the trucks 26, 28 to a common alignment 42, the system 10 may further include an optional device 27, 29 (FIG. 2) coupled to the respective axles (30, 32, 34) (36, 38, 40) of the trucks 26, 28, to provide additional traction performance. Although FIG. 2 illustrates a single device 27, 29 respectively coupled to each truck 26, 28, a single device may be individually coupled to each axle, as discussed in the embodiments below. The optional device 27, 29 is discussed generally herein, and more specific examples of the device 27, 29 are discussed in detail in other later embodiments of the present invention. However, the system 10 may increase the traction performance of the locomotive 18 with the rotatable trucks 26, 28, and without the optional device 27, 29.

As illustrated in the exemplary embodiment of FIG. 2, a respective device 27, 29 may be coupled to the trucks 26, 28 of the locomotive 18, where each device is configured to dynamically affect the normal force 12 applied through one or more of the axles (30, 32, 34) (36, 38, 40) in a normal direction to the rail track surface in contact with the wheels 20. In dynamically affecting the normal force 12, one or more characteristics of the normal force 12 is selected to affect the traction performance of the locomotive 18 as the locomotive 18 travels along the rail track. For example, such characteristics of the normal force 12 may include the magnitude and/or direction of the normal force 12.

In an exemplary embodiment of the system 10, the respective device 27, 29 is configured to increase the aggregate adhesion between the plurality of locomotive wheels 20 and the rail track, by selecting a characteristic of the normal force and dynamically affecting that characteristic. For example, a first axle 30 of the axles (30, 32, 34) (36, 38, 40) is coupled to a respective pair of wheels 20 in a slipping condition on the rail track. Additionally, a second axle 34 is coupled to a respective pair of wheels 20 in a non-slipping condition on the rail track. The respective device 27 is configured to dynamically affect the magnitude and/or direction of the normal force 12 applied through the first axle 30 to control a creep condition of the respective pair of wheels 20, and reduce the slipping condition of the pair of wheels 20, for example. Additionally, the respective device 27 is configured to dynamically affect the magnitude and/or direction of the normal force 12 applied through the second axle 32 to control a creep condition of the respective pair of wheels 20 and maintain the non-slipping condition of the pair of wheels 20, for example.

In a further exemplary embodiment, the plurality of axles (30, 32, 34) (36, 38, 40) may include a performance limited axle, and the respective device 27 may be configured to dynamically affect the magnitude and/or direction of the normal force 12 applied through the performance limited axle to reduce a level of tractive effort passed through the performance limited axle. Examples of such a performance limited axle include: an axle having incurred a limitation in tractive effort attributed to a failure of a mechanical and/or electrical component of the locomotive 18, a thermally affected axle based on a temperature of the traction motor, a mechanical drive train and electric drive of the thermally affected axle exceeding a predetermined threshold, and a reduced capability axle providing limited traction effort efficiency.

In an additional exemplary embodiment of the system 10, the plurality of axles (30, 32, 34) (36, 38, 40) include a friction brake axle, where during the application of a locomotive brake such as an emergency air brake, an independent brake or a train brake, the respective device 27, 29 is configured to dynamically affect the magnitude and/or direction of the normal force 12 applied through the friction brake axle. The dynamic affect of the normal force 12 is based on an open loop or closed loop format, where the closed loop format involves a sensor coupled to the device 27, 29 to detect a creep factor of the friction brake axle. The device 27, 29 is configured to dynamically affect the normal force 12 based upon the creep factor received from the sensor. However, the open loop format involves the respective device 27, 29 dynamically affecting the magnitude and/or direction of the normal force 12, until a particular parameter is achieved, such as a minimum increase in the tractive performance of the locomotive, for example.

In an additional exemplary embodiment of the system 10, the plurality of wheels 20 may include a flatspot wheel with a flat spot along a circumference of the wheel 20. The respective device 27, 29 is configured to dynamically affect the magnitude and/or direction of the normal force 12 applied through an axle 30 which has received the flatspot wheel 20 to impart an upward lift force on the flatspot wheel 20 to limit damage to the flatspot wheel, the rail track, and/or the locomotive 18. If the respective device 27, 29 does not dynamically affect the magnitude and/or direction of the normal force 12 through the axle 30 and impart the upward lift force on the flatspot wheel 20, the flat spot along the flatspot wheel 20 would increase, and possibly lead to damage of the locomotive 18. In an additional exemplary embodiment of the system 10, the plurality of wheels 20 may include a locked wheel 20, received by a respective locked axle 30. In the exemplary embodiment, the respective device 27, 29 is configured to dynamically affect the magnitude and/or direction of the normal force 12 applied through the respective locked axle 30 to impart an upward lift force on the locked wheel 20 to reduce a likelihood of locomotive derailment.

As discussed above, the system 10 is provided to affect a traction performance characteristic of the locomotive 18, and such traction performance characteristics may be based upon an operating characteristic of the locomotive 18. For example, the dynamic affect of the normal force 12 applied through the plurality of axles (30, 32, 34) (36, 38, 40) is configured to affect the traction performance of the locomotive 18 when the locomotive 18 is traveling over the rail track at a low speed lower than a speed threshold. Additionally, the traction performance affected by the system 10 may include a creep factor of the plurality of wheels 20 and a tractive effort of the plurality of wheels 20, for example. In another example, the dynamic affect of the normal force 12 applied the plurality of axles (30, 32, 34) (36, 38, 40) is configured to affect a wheel wear of the plurality of wheels 20, a ride quality of the locomotive 18, or a creep factor of the plurality of wheels 20 when the locomotive 18 is traveling over the rail track at a high speed greater than a speed threshold. The speed threshold may be any arbitrary speed, such as 12 miles per hour, for example. In yet another example, the dynamic affect of the normal force 12 applied through the plurality of axles (30, 32, 34)(36, 38, 40) is configured to dynamically control a respective weight of a pair of wheels 20 across an axle 30 which receives the pair of wheels 20, and/or to dynamically control a respective weight distribution between two axles 30, 32, to affect a curve performance characteristic of the locomotive 18 when the locomotive 18 travels over a curve in the rail track. Although the exemplary embodiment refers to dynamically controlling the weight of the pair of wheels 20 across the axle 30, the system may dynamically control the weight of a pair of wheels across multiple axles. Additionally, although the exemplary embodiment refers to dynamically controlling a weight distribution between two axles 30, 32, the system may be employed to dynamically control weight distribution between more than two axles.

In an additional exemplary embodiment of the system 10, the respective device 27, 29 may dynamically affect a lateral force perpendicular to the normal force 12, where the lateral force is applied through a locomotive axle 30 in the locomotive 18 to enhance a curve performance characteristic of the locomotive 18 when the locomotive travels along a curve in the rail track.

In an additional exemplary embodiment of the system 10, upon a weight of the locomotive 18 having decreased by a weight of consumed locomotive fuel, the respective device 27, 29 is configured to dynamically affect the respective normal force 12 passing through the powered axle 30 and the non-powered axle 32 to increase a weight of the powered axle 30 to the weight of the powered axle 30 prior to the consumption of the locomotive fuel, and further to decrease a weight of the non-powered axle 32 to a weight lower than a weight of the non-powered axle 32 prior to the consumption of the locomotive fuel. In one exemplary embodiment, the weight of consumed locomotive fuel is determined by an algorithm performed by a locomotive controller, or a direct fuel level measurement within the fuel tank. When dynamically affecting the normal force 12 to increase the weight of the powered axle 30, the increase in the weight of the powered axle 30 is configured not to exceed a respective weight threshold for the powered axle 30.

In an additional exemplary embodiment of the system 10, the device 27, 29 is configured to dynamically affect the force 12 applied through the plurality of axles (30, 32, 34) (36, 38, 40) to reduce an amount of ballast on the locomotive 18. The dynamic affect of the normal force 12 through the plurality of axles (30, 32, 34) (36, 38, 40) is utilized to provide a weight balance of the locomotive 18 across opposing ends, where the weight balance is configured to reduce a need to provide ballast on the locomotive.

In an additional exemplary embodiment of the system 10, the plurality of axles (30, 32, 34) (36, 38, 40) include powered axles (30, 34) (36, 40) and a non-powered axle (32) (38), and the dynamic affect of the normal force 12 through the axles (30, 32, 34) (36, 38, 40) involves a weight shift to the powered axles (30, 34) (36, 40) for a limited time period to achieve one or more traction performance requirements of the locomotive 18. A maximum weight shift to the powered axles (30, 34) (36, 40) from the non-powered axle (32, 38) is performed within a minimum time period to minimize a structural impact on a locomotive 18 and rail track infrastructure. In an exemplary embodiment, such a maximum weight shift is 20,000 lbs, for example. In an additional exemplary embodiment, the plurality of wheels 20 have a respective plurality of diameters, where the respective device 27, 29 is configured to dynamically affect the normal force 12 passed through the axles (30, 32, 34) (36, 38, 40) to normalize a wheel wear characteristic of the plurality of wheels 20 attributed to a disparity in the respective plurality of diameters.

Figure 3:
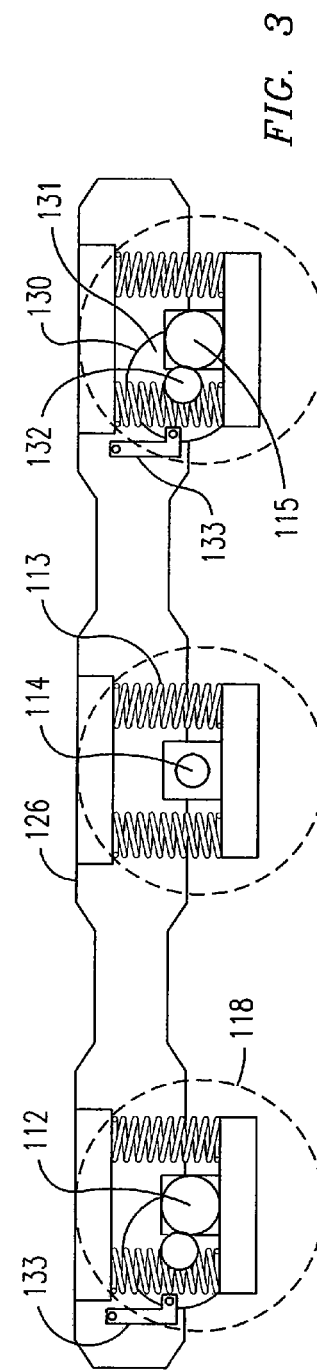
FIG. 3 is a partial side view of an exemplary embodiment of a conventional locomotive truck including a powered axle and a non-powered axle received by the truck.
Figure 4:
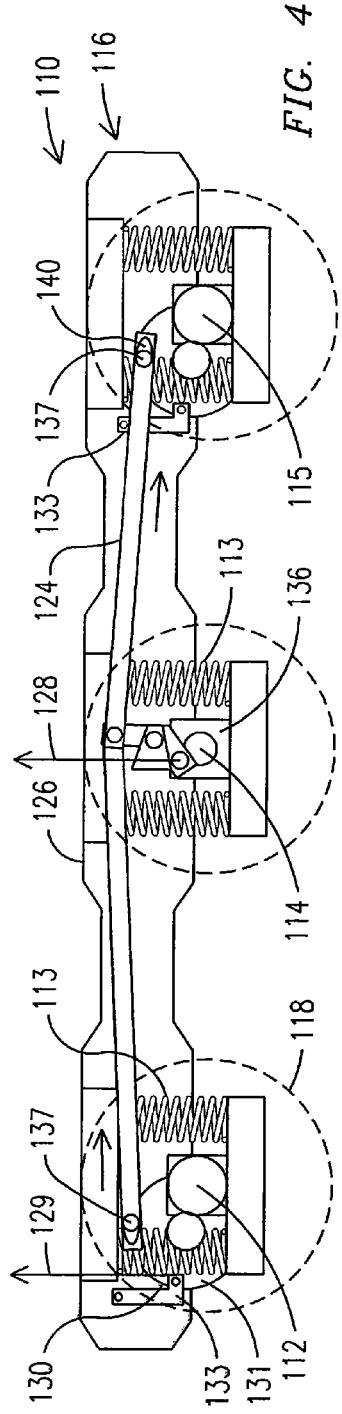
FIG. 4 is a partial side view of an exemplary embodiment of a system for coupling at least two locomotive axles on a locomotive.

FIG. 3 illustrates a conventional truck 126 of a locomotive 116, in which a powered axle 112 and a non-powered axle 114 are not directly coupled to one another. FIG. 4 illustrates an exemplary embodiment of a system 110 for coupling the powered axle 112 to the non-powered axle 114 on a locomotive 116. The locomotive 116 includes a plurality of locomotive wheels 118 and a rail track (not shown), where the plurality of locomotive wheels 118 are received by a respective axle 112, 114.

The system 110 includes a coupling device 124, which is configured to couple the powered axles 112, 115 to the non-powered axle 114 to dynamically affect forces 128, 129 applied through one of the powered axles 112, 115 and non-powered axle 114. One or more characteristics of the forces 128, 129 applied through the powered axles 112, 115 and non-powered axle 114 are selected to affect the traction performance of the locomotive 116 as the locomotive travels along the rail track. In an exemplary embodiment, the one or more characteristics of the forces 128, 129 are selected to optimize the traction performance of the locomotive 116 as the locomotive travels along the rail track.

In the exemplary embodiment of the system 110 illustrated in FIG. 4, the dynamic affect of the forces 128, 129 applied through one or more of the powered axles 112, 115 and non-powered axle 114 is configured to affect a level of tractive effort passed through the axles 112, 115, 114. In an exemplary embodiment, a characteristic of the forces 128, 129 is the magnitude and/or direction of the forces, for example.

As illustrated in the exemplary embodiment of FIG. 4, the coupling device 124 is a mechanical coupling device configured to mechanically couple the powered axles 112, 115 and the non-powered axle 114. Although FIG. 4 illustrates the coupling device 124 coupling a pair of powered axles 112, 115 to a non-powered axle 114, the coupling device may be utilized to coupled one powered axle or more than two powered axles to one or more non-powered axles, for example. The mechanical coupling device 124 is coupled to a respective traction motor 130 of the powered axle 112. As illustrated in FIG. 4, the coupling device 124 is utilized to couple a pair of powered axles 112, 115 to the non-powered axle 114, and the mechanical coupling device 124 may be a rigid member or a flexible member, and one or more compliant members 113 couples the mechanical coupling device 124 to the non-powered axle 114.

In the illustrated exemplary embodiment of FIG. 4, the pair of powered axles 112, 115 includes a respective traction motor 130 within a motor frame 131 and a respective gear 132. Additionally, the pair of powered axles 112, 115 is rotated by the respective gear 132, which is driven by the respective traction motor 130. In the exemplary embodiment of the system 110, during the rotation of the pair of powered axles 112, 115 by the respective gear 132, a force 129 is imparted on the pair of powered axles 112, 115, a stationary component of the traction motor, and a rotating component of the traction motor through a bearing. Once the force 129 is imparted on the pair of powered axles 112, 115 and the stationary component of the traction motor, the mechanical coupling device 124 is coupled to the non-powered axle 114 through a journal bearing housing 136. The mechanical coupling device 124 is configured to impart a secondary force 128 on the non-powered axle 114 through the journal bearing housing 136 to increase the level of tractive effort passed through the pair of powered axles 112, 115 and the non-powered axle 114.

As discussed above and as illustrated in the exemplary embodiment of FIG. 2, the locomotive 116 includes a pair of trucks 26, 28, and a respective pair of powered axles 112, 115 and a non-powered axle 114 received by a respective truck. A fixed collective force is applied through the respective pair of powered axles 112, 115 and the non-powered axle 114 for each respective truck. A variable powered force is applied through the respective pair of powered axles 112, 115 and a variable non-powered force is applied through the non-powered axle 114, where the sum of the variable powered and non-powered forces is the fixed collective force. For example, the fixed collective force through a pair of powered axles and a non-powered axle of a truck may be 210,000 lbs, but the variable powered force applied through the pair of powered axles may vary between 120,000 lbs and 160,000 lbs, while the variable non-powered force applied through the non-powered axle may respectively vary between 90,000 lbs and 50,000 lbs, for example. As discussed above, and in further detail below, the coupling device 124 is provided to maximize the variable powered force through the pair of powered axles 112, 115, while minimizing the variable non-powered force through the non-powered axle 114. As discussed above, although the illustrated truck in FIG. 4 includes a respective pair of powered axles 112, 115 and a non-powered axle 114, the truck may include one or more than two powered axles and may include more than one non-powered axle, for example. The mechanical coupling device 124 is configured to affect the magnitude and/or direction of the variable powered force and the variable non-powered force applied through the respective pair of powered axles 112, 115 and the non-powered axle 114.

As further illustrated in the exemplary embodiment of FIG. 4, the mechanical coupling device 124 includes a slot 140 coupled to the stationary component of the traction motor 130. The slot 140 is configured to receive a respective member 137 coupled to a respective motor frame 131 of the pair of powered axles 112, 115. The slot 140 and respective member 137 are configured to provide a one-way coupling such that the mechanical coupling device 124 imparts the secondary force 128 on the non-powered axle 114 when the force 129 is imparted on the pair of powered axles 112, 115, and the mechanical coupling device 124 is decoupled from the non-powered axle 114 when the force 129 is imparted on the pair of powered axles 112, 115 in an upward direction away from the rail track to increase a level of tractive effort passed through the pair of powered axles 112, 115. The particular slot 140 and respective member 137 are dimensioned and positioned such that the one-way coupling is provided based upon the direction of the force 129 imparted on the pair of the powered axles 112, 115, and thus whether the force 129 increases or decreases the tractive effort passed through the pair of powered axles 112, 115.

As discussed in further detail in the embodiments below, instead of a rigid member, the coupling device 124 may take the form of a plurality of hydraulic actuators respectively coupled to the plurality of axles 112, 114, 115, where a compressed fluid within a first hydraulic actuator coupled to a first axle 112 is selectively supplied to a second hydraulic actuator coupled to a second axle 114 of the plurality of axles. In the exemplary embodiment, the compressed fluid within the second hydraulic actuator is configured to impart the secondary force 128 on the second axle 114. One of more characteristics of the secondary force 128 may be affected, including the magnitude and/or direction of the force 128, to increase a level of tractive effort passed through the second axle 114.

Figure 10:
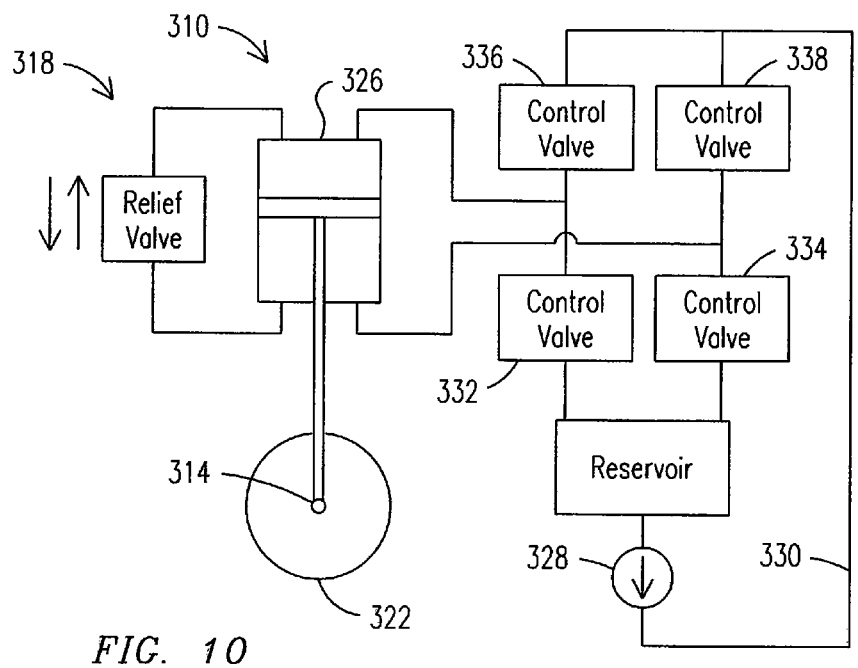
FIG. 10 is a schematic view of an exemplary embodiment of a system for dynamically affecting a force applied through a locomotive axle of a locomotive configured to travel along a rail track.

FIG. 10 illustrates an exemplary embodiment of a system 310 for dynamically affecting a force applied through a locomotive axle 314 of a locomotive 318 configured to travel along a rail track. The locomotive 318 includes a plurality of locomotive axles and a plurality of locomotive wheels received by the respective plurality of axles. The system 310 includes a device configured to selectively impart a force through a locomotive axle 314 to control a respective weight of the locomotive axle 314 on the rail track for affecting a traction performance of the locomotive 318 traveling along the rail track. Although FIG. 10 illustrates a system 310 to selectively impart a force through one locomotive axle 314, the system may be configured to selectively impart a force through more than one locomotive axle.

In the illustrated exemplary embodiment of FIG. 10, the system 310 includes the device to selectively impart a force through the locomotive axle 314, such as a hydraulic actuator 326 coupled to the respective locomotive axle 314. Although FIG. 10 illustrates one hydraulic actuator 326 coupled to a locomotive axle 314, a hydraulic actuator may be coupled to more than one respective locomotive axle, to selectively impart a force through the respective locomotive axle. A variable displacement pump 328 is coupled to the hydraulic actuator 326, and the variable displacement pump 328 is configured to supply a pressurized hydraulic fluid 330 at a selectively controlled pressure to the hydraulic actuator 326. The hydraulic actuator 326 is configured to selectively impart the force through the respective locomotive axle 314 based upon the selectively controlled pressure. In the illustrated exemplary embodiment of FIG. 10, the hydraulic actuator 326 is directly coupled to the respective locomotive axle 314. Although FIG. 10 illustrates one variable displacement pump 328, more than one variable displacement pump may be utilized. A plurality of control valves 332, 334, 336, 338 are respectively coupled to the variable displacement pump 328 and the hydraulic actuator 326, and the control valves 332, 334, 336, 338 are selectively activated to control the force imparted through the respective locomotive axle 314.

Figure 11:
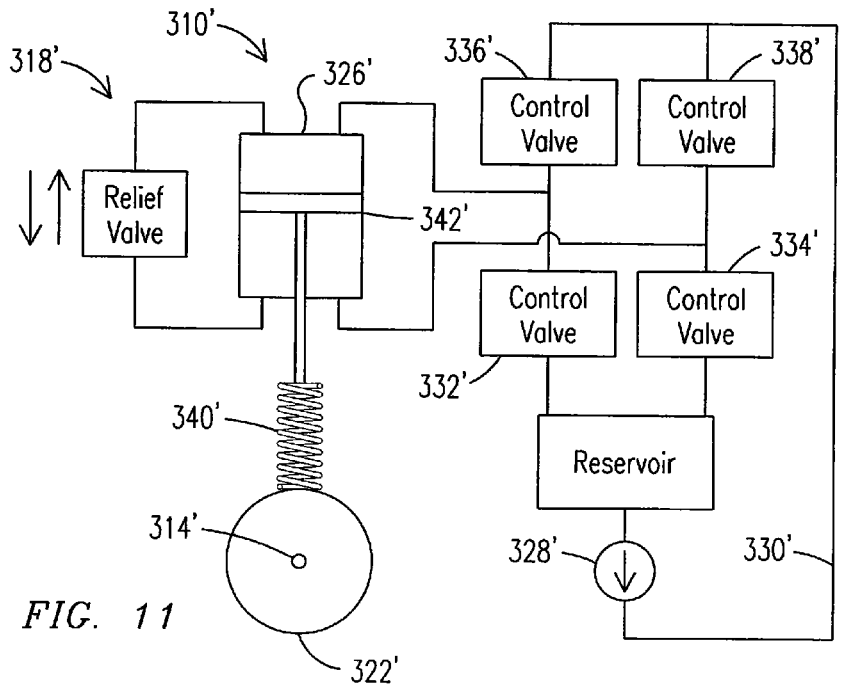
FIG. 11 is a schematic view of an exemplary embodiment of a system for dynamically affecting a force applied through a locomotive axle of a locomotive configured to travel along a rail track.

FIG. 11 illustrates an additional exemplary embodiment of a system 310' for dynamically affecting a force applied through a locomotive axle 314' of a locomotive 318' configured to travel along a rail track. As illustrated in the exemplary embodiment of FIG. 11, the system 310' includes a compliant member 340', such as a spring, for example, disposed between the hydraulic actuator 326' and the respective locomotive axle 314' such that the hydraulic actuator 326' is coupled to the respective locomotive axle 314' in a compliant manner. The system 310' further includes a pair of displacement limits (not shown) coupled to the hydraulic actuator 326' to limit the force selectively imparted on the respective locomotive axle 314'. As further illustrated in the exemplary embodiment of FIG. 11, the system 310' includes a plurality of control valves 332', 334', 336', 338' coupled to the variable displacement pump 328' and the hydraulic actuator 326', where the plurality of control valves 332', 334', 336', 338' are selectively activated to control a position 342' of the hydraulic actuator. Those elements not specifically discussed herein are similar to those equivalent-numbered elements described in the previous embodiments, with prime notation, and require no further discussion herein.

Figure 12:
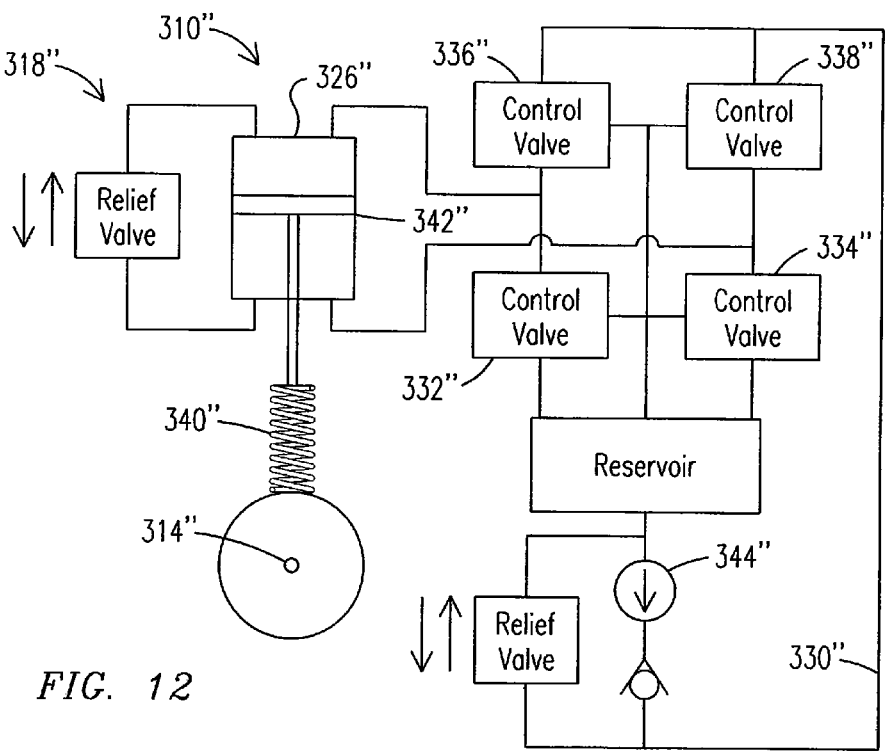
FIG. 12 is a schematic view of an exemplary embodiment of a system for dynamically affecting a force applied through a locomotive axle of a locomotive configured to travel along a rail track.

FIG. 12 illustrates an additional exemplary embodiment of a system 310" for dynamically affecting a force applied through a locomotive axle 314" of a locomotive 318" configured to travel along a rail track. The system 310" includes a positive displacement pump 344" coupled to the hydraulic actuator 326", where the positive displacement pump 344" is configured to selectively control a position 342" of the hydraulic actuator 326" based upon supplying a pressurized hydraulic fluid 330" at a variable pressure to the hydraulic actuator 326". The hydraulic actuator 326" is configured to selectively impart the force through the respective locomotive axle 314" based upon the selectively controlled position 342" of the hydraulic actuator 326". As with the embodiment of FIG. 11, a compliant member 340", such as a spring, for example, is disposed between the hydraulic actuator and the respective axle such that the hydraulic actuator is coupled to the respective axle in a compliant manner. Additionally, a plurality of control valves 332", 334", 336", 338" are coupled to the positive displacement pump 344" and the hydraulic actuator 326", where the control valves 332", 334", 336", 338" are selectively activated to control the position 342" of the hydraulic actuator. A pair of displacement limits (not shown) is coupled to the hydraulic actuator 326" to limit the force selectively imparted on the respective locomotive axle 314". Those elements not specifically discussed herein are similar to those equivalent-numbered elements described in the previous embodiments, with double prime notation, and require no further discussion herein.

Figure 8:
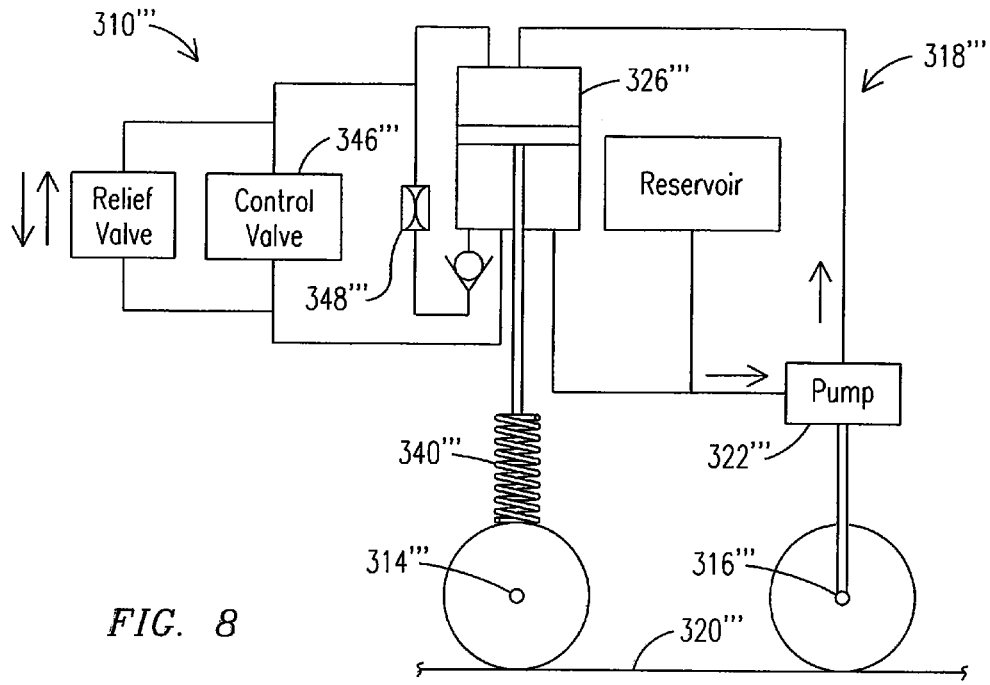
FIG. 8 is a schematic view of an exemplary embodiment of a system for dynamically affecting a force applied through a locomotive axle of a locomotive configured to travel along a rail track.
Figure 9:
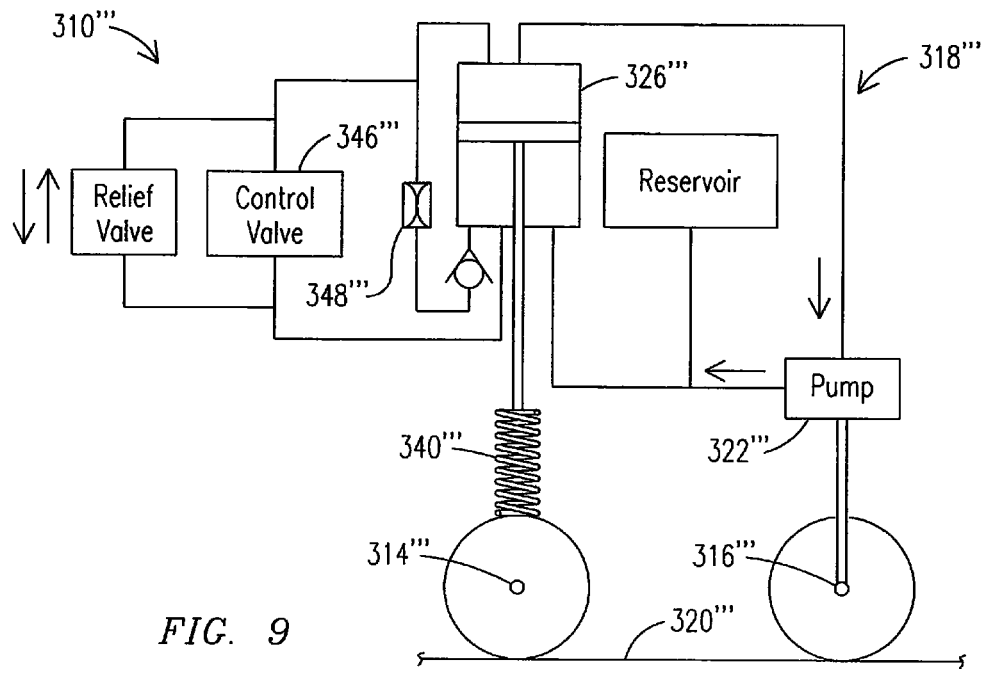
FIG. 9 is a schematic view of an exemplary embodiment of a system for dynamically affecting a force applied through a locomotive axle of a locomotive configured to travel along a rail track.

FIGS. 8-9 illustrate a number of exemplary embodiments of a system 310''' for dynamically affecting a force applied through a locomotive axle 314''' of a locomotive 318''' configured to travel along a rail track. As illustrated in the exemplary embodiment of FIG. 8, the system 310''' includes a hydraulic actuator 326''' configured to selectively impart the force through the respective locomotive axle 314''' based upon energy captured from a vibration of a vibrated axle 316''' of the plurality of axles along the rail track. The system 310''' includes a pressurized hydraulic fluid pump 322''' coupled to the vibrated axle 316''' and the hydraulic actuator 326''', where the captured vibrational energy is utilized to pressurize the hydraulic fluid within the hydraulic fluid pump 322".

The hydraulic actuator 326''' is configured to selectively impart the force through the respective locomotive axle 314''' based upon the pressurized hydraulic fluid delivered from the pump 322''' to the hydraulic actuator 326'''. The system 310''' further includes a pair of displacement limits (not shown) coupled to the hydraulic actuator 326''' to limit the force selectively imparted on the respective locomotive axle 314'''. A compliant member 340''', such as a spring, for example, is disposed between the hydraulic actuator 326''' and the respective locomotive axle 314''' such that the hydraulic actuator 326''' is coupled to the respective locomotive axle 314''' in a compliant manner. Once the hydraulic actuator 326''' selectively imparts the force through the respective locomotive axle 314''', the compliant member 340''' is configured to exert a reactive force on the respective locomotive axle 314'''. Although FIGS. 8-9 illustrate one vibrated axle 316''' from which vibrational energy is obtained, and one locomotive axle 314''' to which the hydraulic actuator 326'''selectively imparts the force, the system 310''' may include more than one vibration axle from which vibrational energy is obtained and/or more than one locomotive axle to which a respective hydraulic actuator selectively imparts a force. The locomotive axles 314''', 316''' may include one or more powered axles, or one or more non-powered axles.

In the exemplary embodiment illustrated in FIG. 9, the pressurized hydraulic fluid pump 322''' has an input which delivers pressurized hydraulic fluid to a bottom chamber of the hydraulic actuator 326" which is coupled to a non-powered axle 314''', thereby imparting an upward force on the non-powered axle 314''' in a normal direction to the rail track. In the exemplary embodiment illustrated in FIG. 8, the pressurized hydraulic fluid pump 322" has an input which delivers pressurized hydraulic fluid to a top chamber of the hydraulic actuator 326" which is coupled to a powered axle 314", thereby imparting a downward force on the powered axle 314" in a normal direction to the rail track. As further illustrated in the exemplary embodiments of FIGS. 8-9, a control valve 346''' is coupled to the hydraulic actuator 326''' to selectively control a pressure difference across the hydraulic actuator 326'''. The control valve 346''' may be activated to rapidly remove a weight shift imparted on a respective locomotive axle 314''' based upon the selective imparting of the force on the respective locomotive axle 314'''. In addition to the control valve 346''', the exemplary embodiments of FIGS. 8-9 include a high restriction valve 348''' coupled to the hydraulic actuator 326''' to selectively decrease a pressure difference across the hydraulic actuator 326". The high restriction valve 348''' is selectively activated to slowly remove a weight shift imparted on a respective locomotive axle 314''' based upon the selective imparting of the force on the respective locomotive axle 314'''. Those elements not specifically discussed herein are similar to those equivalent-numbered elements described in the previous embodiments, with triple prime notation, and require no further discussion herein.

Figure 5:
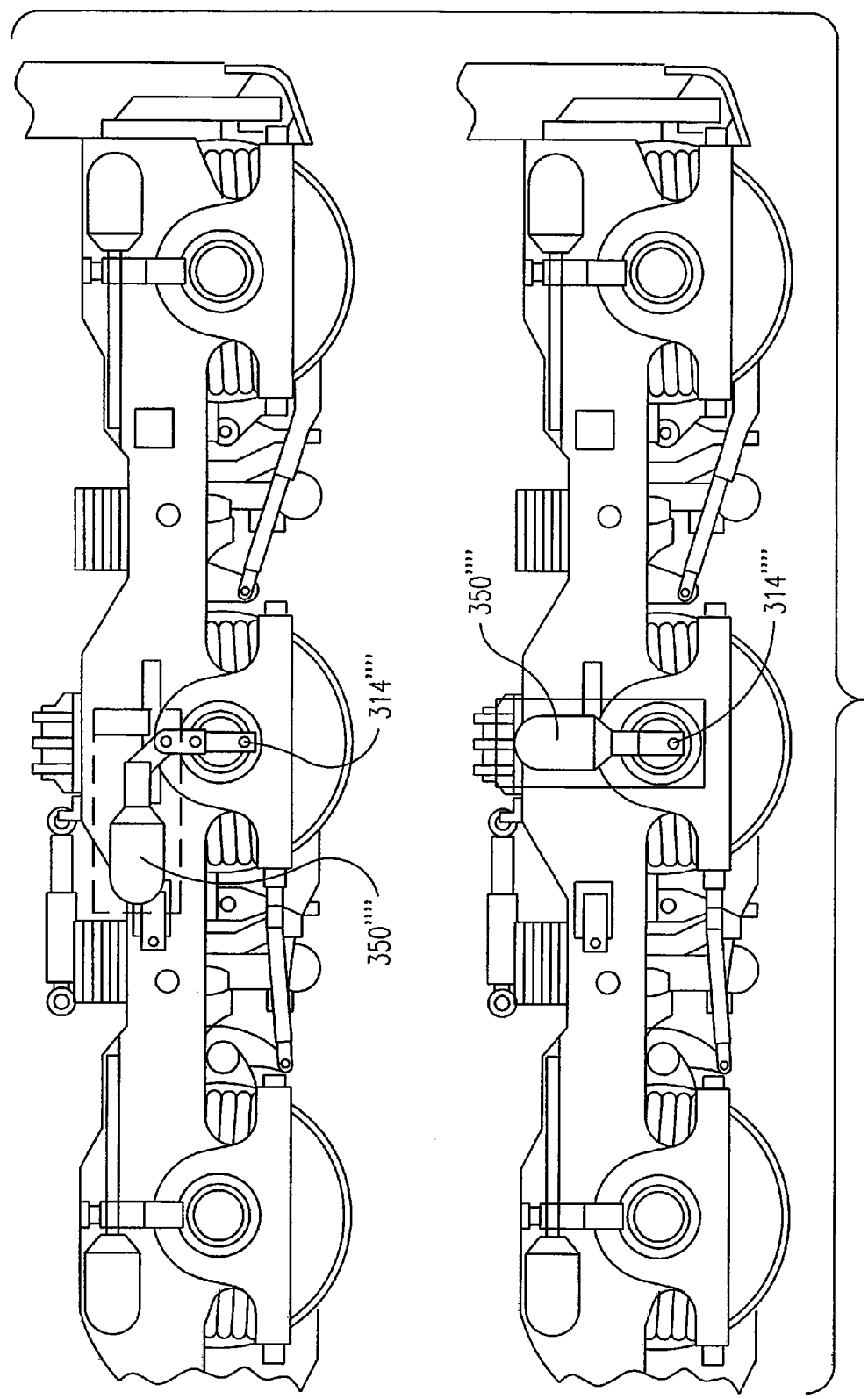
FIG. 5 is a side view of an exemplary embodiment of a system for dynamically affecting a force applied through a locomotive axle of a locomotive configured to travel along a rail track.
Figure 6:
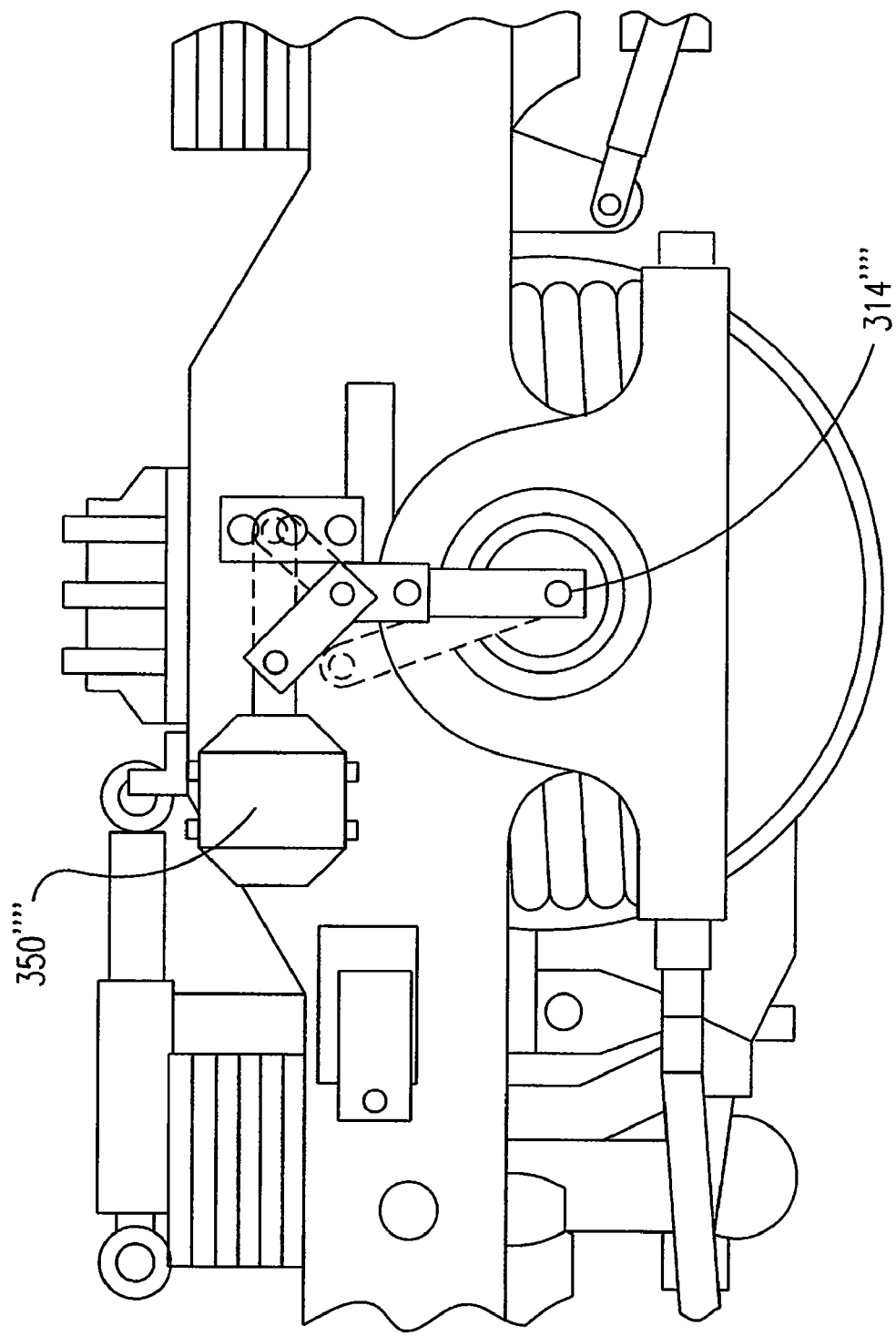
FIG. 6 is a partial side view of an exemplary embodiment of a system for dynamically affecting a force applied through a locomotive axle illustrated in FIG. 5.
Figure 7:
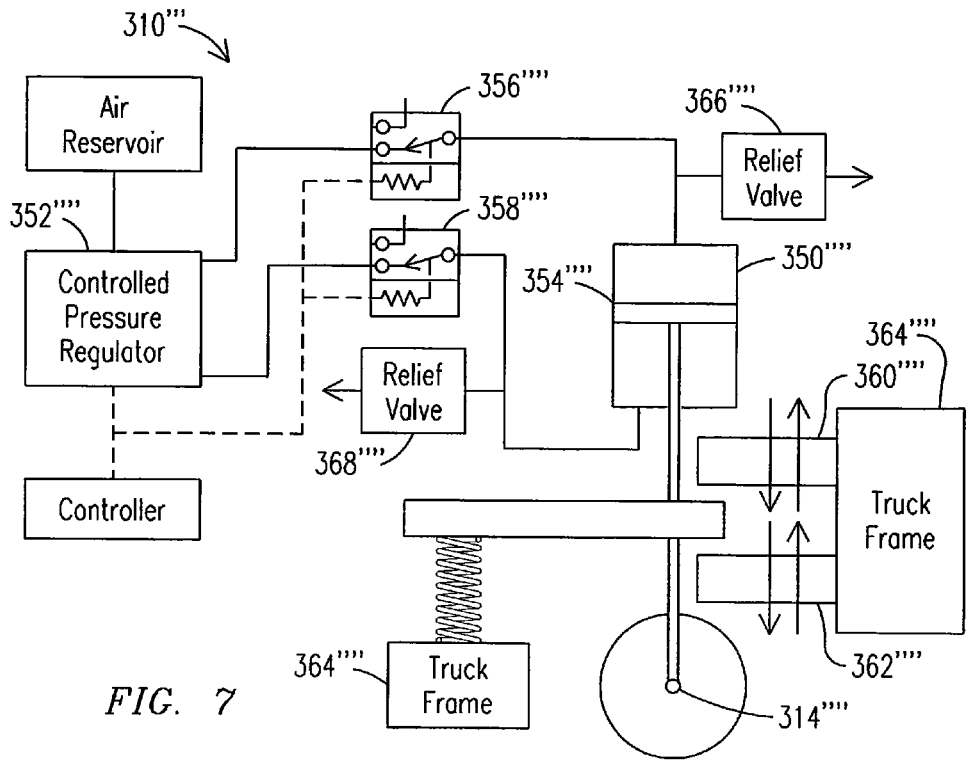
FIG. 7 is a schematic view of an exemplary embodiment of a system for dynamically affecting a force applied through a locomotive axle of a locomotive configured to travel along a rail track.

Although FIGS. 8-12 illustrate a hydraulic actuator 326''' being utilized as a device to selectively impart a force through a locomotive axle 314''' to control a respective weight of the locomotive axle 314''' on the rail track 320''', a pneumatic actuator 350'''', as illustrated in FIGS. 5-7, may be similarly utilized in place of the hydraulic actuator and similarly coupled to the locomotive axle 314''''. In an exemplary embodiment of a system 310'''' illustrated in FIG. 7, a controlled pressure regulator 352'''' is coupled to the pneumatic actuator 350'''', where the controlled pressure regulator 352'''' is configured to selectively control a position 354'''' of the pneumatic actuator 350'''' based upon supplying pressurized air at a near constant pressure to the pneumatic actuator 350''''. The pneumatic actuator 350'''' is configured to selectively impart the force through the respective locomotive axle 314'''' based upon the selectively controlled position 354'''' of the pneumatic actuator. The system 310'''' further includes a pair of control valves 356'''', 358'''' coupled to the controlled pressure regulator 352'''' and the pneumatic actuator 350'''', where the control valves 356'''', 358'''' are selectively activated to control a force imparted by the pneumatic actuator 350''''. Although FIG. 7 illustrates a pair of control valves, less than two or more than two control valves may be utilized. A pair of displacement limits 360'''', 362'''' is coupled to a locomotive truck frame 364'''', where the respective locomotive axle 314'''' is received by the locomotive truck frame 364'''', and the pair of displacement limits 360'''', 362'''' are configured to limit the position 354'''' of the respective locomotive axle 314'''' based upon the controlled force imparted by the pneumatic actuator 350''''. Additionally, a pair of relief valves 366'''', 368'''' are coupled to the pneumatic actuator 350'''', and are configured to rapidly remove a weight shift imparted on a respective locomotive axle 314'''' based upon the selectively controlled forced imparted by the pneumatic actuator 350''''. Those elements not specifically discussed herein are similar to those equivalent-numbered elements described in the previous embodiments, with quadruple prime notation, and require no further discussion herein.

In addition to the embodiments discussed above, the device configured to selectively impart a force through a locomotive axle to control a respective weight of the locomotive axle on the rail track may be a mechanical actuator, an electro-mechanical actuator, a motor driven actuator, a manual driven actuator and a mechanical linkage actuator, coupled to a respective locomotive axle.

Figure 13:
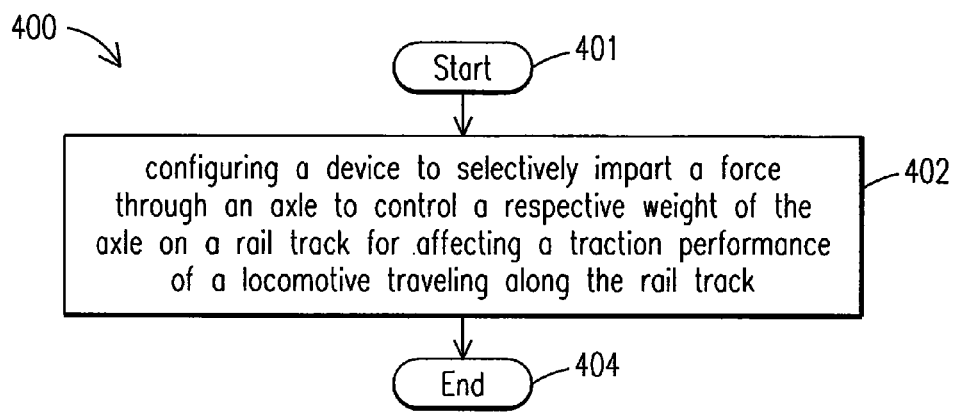
FIG. 13 is an exemplary embodiment of a method for dynamically affecting a force applied through a locomotive axle of a locomotive configured to travel along a rail track.

FIG. 13 illustrates an exemplary embodiment of a method 400 for dynamically affecting a force applied through a locomotive axle 314 of a locomotive 318 configured to travel along a rail track. The method 400 begins (block 401) by configuring (block 402) a device to selectively impart the force through the locomotive axle 314 to control a respective weight of the locomotive axle 314 on the rail track for affecting a traction performance of the locomotive 318 traveling along the rail track, before ending at block 404.

As discussed in the previous embodiments, a device may be coupled to a respective locomotive axle and the controller to selectively impart a force through the respective axle, to affect a tractive characteristic of the locomotive. The device may be any one of a hydraulic actuator, a pneumatic actuator, an electro magnetic actuator, a mechanical actuator, a motor driven actuator and a manually operated actuator, for example. In an exemplary embodiment of the system 500, the sensor 506 may be respectively coupled to the respective locomotive axle, to measure the force imparted by the device through the respective axle, and communicate the measured force to the controller 502. As further discussed in the previous embodiments of the present invention, such devices are configured to selectively impart a force through the respective axle in a direction away from the rail or toward the rail. The force may be based upon one or more dynamic characteristics of the hydraulic actuator or the pneumatic actuator, for example. In an exemplary embodiment of the system 500, the sensor 506 is coupled to the hydraulic actuator or the pneumatic actuator to measure the one or more dynamic characteristics of the hydraulic actuator or pneumatic actuator, where the dynamic characteristic may be the position or an applied pressure of the hydraulic actuator or the pneumatic actuator, for example.

Additionally, in the exemplary embodiment of FIG. 13, the system 500 includes a respective weight sensor 516 coupled to the plurality of axles and the controller 502, where the respective weight sensor 516 is configured to measure a respective static weight of the plurality of wheels on the rail track when the locomotive is stationary. Upon measuring the static weight of the plurality of wheels on the rail track, the respective weight sensor 516 is configured to communicate the respective static weight to the controller 502. The respective weight sensor 516 may be provided as a backup or alternative calculation of the static weight 503 calculation based upon the locomotive characteristics 504, as discussed above. An example of the locomotive characteristics 504 which are utilized to determine the static weight 503 of the locomotive are an established static weight of each wheel on the rail, an established static weight of the locomotive, a static weight of fuel within a locomotive fuel tank, a static weight of sand within a locomotive sand applicator, and a respective diameter of the plurality of wheels.

As further illustrated in the exemplary embodiment of FIG. 13, the system 500 includes a grade sensor 520 coupled to the locomotive and the controller 502, where the grade sensor 520 is configured to determine one or more grade factors of the locomotive when the locomotive is stationary. The controller 502 is configured to receive the one or more grade factors to determine the static weight 503 of the plurality of wheels on the rail track.

Figure 15:
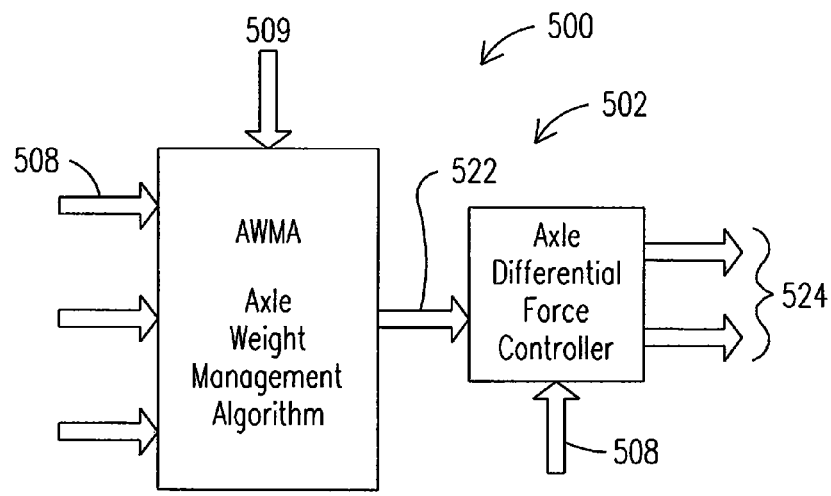
FIG. 15 is a schematic view of an exemplary embodiment of a system for determining a force applied through a plurality of locomotive axles in a locomotive configured to travel along a rail track.

In addition to determining the static weight 503 of the plurality of wheels on the rail track, the controller 502 is configured to determine a respective target weight 522 of the plurality of wheels on the rail. As illustrated in the exemplary embodiment of FIG. 14, in which the controller 502 involves an axle weight management algorithm which receives as input the dynamic weight 508 of the plurality of wheels on the rail, and a respective weight threshold 509 for the respective plurality of axles, and generates the respective target weight 522 of the plurality of wheels on the rail. Accordingly, the respective target weight 522 of the plurality of wheels on the rail is based upon the respective dynamic weight 508 of the plurality of wheels on the rail, and the respective weight threshold 509 for the respective plurality of axles. The respective dynamic weight 508 of the plurality of the plurality of wheels on the rail track is subsequently modified to the respective target weight 522 of the respective plurality of wheels. The respective target weight 522 for the plurality of wheels on the rail is configured to affect a level of tractive effort passed through the plurality of wheels along the rail. As illustrated in the exemplary embodiments of FIGS. 14-15, upon determining the respective target weight 522 for the plurality of wheels on the rail, the controller 502 is configured to compare the respective target weight 522 of the plurality of wheels on the rail with the respective dynamic weight 508 of the plurality of wheels on the rail. As illustrated in the exemplary embodiment of FIG. 15, the controller 502 may compare these quantities in a closed loop or an open loop arrangement. Regardless of which method of comparison is used, upon comparing the respective target weight 522 and the respective dynamic weight 508, the controller 502 is configured to determine a respective command 524 to a hydraulic actuator or pneumatic actuator respectively coupled to the respective plurality of axles. Although such devices as a hydraulic actuator and pneumatic actuator are discussed in this exemplary embodiment of the controller 502 for imparting a force through the plurality of locomotive axles, other devices may be utilized which similarly are capable of selectively imparting a force through a respective locomotive axle.

Upon determining the respective commands 524, the controller 502 is configured to communicate the respective commands 524 to the respective hydraulic actuator or pneumatic actuator respectively coupled to the plurality of axles and configured to impart a force through the respective axle in a direction either away from the rail or toward the rail, in response to the respective commands 524. Once the hydraulic actuator or pneumatic actuator impart the force through the respective locomotive axle, the dynamic weight of the plurality of wheels on the rail is modified to the respective target weight of the plurality of wheels on the rail, and one or more tractive characteristics of the locomotive is enhanced.

In an additional exemplary embodiment of the system 500, a controller 502 is configured to determine a respective dynamic weight command 524 of the plurality of axles on the rail track to dynamically shift a respective weight of the plurality of axles on the rail track based upon a rail track condition, a locomotive operating condition, an operator input, and/or a geographical input of a location along the rail track. In an exemplary embodiment of the system 500, the locomotive operating condition may be a locomotive speed traveling along the rail track, and such a locomotive speed below a speed threshold may prompt the dynamic weight command 524 of the plurality of axles on the rail tracks to shift a respective weight among the plurality of axles. In an additional exemplary embodiment, a notch level of a throttle may be the locomotive operating condition, and upon a locomotive operator increasing the notch level above a notch threshold (e.g., 8), this may prompt the dynamic weight command 524 of the plurality of axles on the rail tracks to shift a respective weight among the plurality of axles. In an additional exemplary embodiment, a level of tractive effort may be utilized as the locomotive operating condition and may prompt the dynamic weight command 524 of the plurality of axles, for example. In an additional exemplary embodiment, a creep factor of the plurality of wheels, such as a slipping wheel condition or a non-slipping wheel condition, for example, may be utilized to prompt the dynamic weight command 524 of the plurality of axles, for example. In an additional exemplary embodiment, a level of fuel within a fuel tank of the locomotive may be utilized as the locomotive operating condition to prompt the dynamic weight command 524 of the plurality of axles, for example.

Based on the foregoing specification, the above-discussed embodiments of the invention may be implemented using computer programming or engineering techniques including computer software, firmware, hardware or any combination or subset thereof, wherein the technical effect is to dynamically determine a force applied through a plurality of locomotive axles in a locomotive configured to travel along a rail track in a travel direction. Any such resulting program, having computer-readable code means, may be embodied or provided within one or more computer-readable media, thereby making a computer program product, i.e., an article of manufacture, according to the discussed embodiments of the invention. The computer readable media may be, for instance, a fixed (hard) drive, diskette, optical disk, magnetic tape, semiconductor memory such as read-only memory (ROM), etc., or any transmitting/receiving medium such as the Internet or other communication network or link. The article of manufacture containing the computer code may be made and/or used by executing the code directly from one medium, by copying the code from one medium to another medium, or by transmitting the code over a network.

One skilled in the art of computer science will easily be able to combine the software created as described with appropriate general purpose or special purpose computer hardware, such as a microprocessor, to create a computer system or computer sub-system of the method embodiment of the invention. An apparatus for making, using or selling embodiments of the invention may be one or more processing systems including, but not limited to, a central processing unit (CPU), memory, storage devices, communication links and devices, servers, I/O devices, or any sub-components of one or more processing systems, including software, firmware, hardware or any combination or subset thereof, which embody those discussed embodiments the invention.

While the invention has been described with reference to one or more exemplary embodiments, it will be understood by those skilled in the art that various changes, omissions and/or additions may be made and equivalents may be substituted for elements thereof without departing from the spirit and scope of the invention. In addition, many modifications may be made to adapt a particular situation or material to the teachings of the invention without departing from the scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A system for a rail vehicle configured to travel along a rail track, said system comprising:
    a truck comprising a non-powered axle and at least one powered axle, wherein each of the at least one powered axle comprises an axle, a traction motor, and a gear, wherein the gear is drivable by the motor, and wherein the axle is rotatable by the gear;
    a device coupled to the non-powered axle and the at least one powered axle for dynamically adjusting a weight distribution between the non-powered axle and the at least one powered axle, wherein the device is controllable to shift weight to the at least one powered axle from the non-powered axle, thereby decreasing a weight imparted by the non-powered axle on the rail track and increasing a weight imparted by the at least one powered axle on the rail track; and
    a controller operable according to a computer program to control the device for dynamically adjusting the weight distribution based on a static weight of each wheel of the rail vehicle on the rail track.

2. The system of claim 1 wherein: the at least one powered axle comprises a pair of powered axles; and the device couples the pair of powered axles to the non-powered axle and is controllable to shift weight to the pair of powered axles from the non-powered axle.

3. The system of claim 2 wherein the weight shifted to the pair of powered axles from the non-powered axle is 40,000 lbs.

4. The system of claim 2 wherein the device comprises at least one rigid member.

5. The system of claim 2 wherein the device comprises a plurality of hydraulic actuators respectively coupled to the non-powered axle and the pair of powered axles.

6. The system of claim 1 wherein the controller determines the static weight when the vehicle is stationary.

7. The system of claim 6 wherein the controller controls the device, for dynamically adjusting the weight distribution, based on a speed of the rail vehicle traveling along the rail track.

8. The system of claim 6 wherein the controller controls the device, for dynamically adjusting the weight distribution, based on a notch level of a throttle of the rail vehicle.

9. The system of claim 6 wherein the controller controls the device, for dynamically adjusting the weight distribution, based on an amount of fuel consumed by the rail vehicle.

10. The system of claim 1, further comprising a weight sensor communicatively coupled to the controller, the controller operable to determine the static weight of the locomotive based on a static weight measurement from the weight sensor when the locomotive is stationary.

11. The system of claim 1, wherein the controller determines the static weight based on a static weight of fuel within the locomotive.

12. The system of claim 1, wherein the controller determines the static weight based on a static weight of sand within a sand applicator of the locomotive.

13. The system of claim 1, wherein the controller determines the static weight based on a grade of the locomotive.

14. A system for a rail vehicle configured to travel along a rail track, said system comprising:
    a truck comprising a non-powered axle and at least one powered axle, wherein each of the at least one powered axle comprises an axle, a traction motor, and a gear, wherein the gear is drivable by the motor, and wherein the axle is rotatable by the gear;
    a device coupled to the non-powered axle and the at least one powered axle for dynamically adjusting a weight distribution between the non-powered axle and the at least one powered axle, wherein the device is controllable to shift weight to the at least one powered axle from the non-powered axle, thereby decreasing a weight imparted by the non-powered axle on the rail track and increasing a weight imparted by the at least one powered axle on the rail track; and
    a controller operable according to a computer program to control the device for dynamically adjusting the weight distribution based on a static weight of the rail vehicle, wherein:
    the device comprises at least one hydraulic actuator each coupled to a respective one of the non-powered axle or one of the at least one powered axle; and
    the system further comprises:
    a displacement pump coupled to the hydraulic actuator, the displacement pump configured to supply a pressurized hydraulic fluid at a selectively controlled pressure to said hydraulic actuator, said hydraulic actuator configured to shift weight to the at least one powered axle from the non-powered axle based upon the selectively controlled pressure; and
    a compliant member disposed between the hydraulic actuator and respective one of the non-powered axle or one of the at least one powered axle such that the hydraulic actuator is coupled to said respective one of the non-powered axle or one of the at least one powered axle in a compliant manner.

15. A system for dynamically affecting a force applied through at least one axle of a rail vehicle configured to travel along a rail track, said rail vehicle having a plurality of axles and a plurality of wheels being received by said plurality of axles, said system comprising:
    a device configured to selectively impart said force through said at least one axle to control a respective weight of said at least one axle on said rail track for affecting a traction performance of said rail vehicle traveling along said rail track, wherein said force is a normal force applied through said at least one axle in a normal direction to said rail track, and wherein said device is at least one hydraulic actuator coupled to a respective axle of the rail vehicle;

a displacement pump coupled to said hydraulic actuator, said displacement pump configured to supply a pressurized hydraulic fluid to said hydraulic actuator, said hydraulic actuator configured to selectively impart said force through said respective axle based upon a pressure of the pressurized hydraulic fluid;

a compliant member disposed between said hydraulic actuator and said respective axle such that said hydraulic actuator is coupled to said respective axle in a compliant manner; and a suspension assembly mounting said respective axle to a truck, the suspension assembly including one or more springs.

16. The system of claim 15 wherein the displacement pump is a variable displacement pump configured to supply the pressurized hydraulic fluid at a selectively controlled pressure to said hydraulic actuator, said hydraulic actuator configured to selectively impart said force through said respective axle based upon said selectively controlled pressure.

17. The system of claim 15 wherein the displacement pump is a positive displacement pump configured to selectively control a position of said hydraulic actuator based upon supplying the pressurized hydraulic fluid at a variable pressure to the hydraulic actuator, said hydraulic actuator configured to selectively impart said force through said respective axle based upon the selectively controlled position of said hydraulic actuator.

18. The system of claim 15, further comprising a pair of displacement limits coupled to said hydraulic actuator to limit said force selectively imparted on said respective axle.

19. The system of claim 15 further comprising at least one control valve coupled to said variable displacement pump and said hydraulic actuator, said at least one control valve being selectively activated to control a position of said hydraulic actuator.

20. The system of claim 15 wherein a magnitude of the force imparted on said at least one axle is configured to vary relative to a baseline value of said force by a multiplier factor that ranges from a value of 0.71 to a value of 1.26.

21. A system for dynamically affecting a force applied through at least one axle of a rail vehicle configured to travel along a rail track, said rail vehicle having a plurality of axles and a plurality of wheels being received by said plurality of axles, said system comprising:

a device configured to selectively impart said force through said at least one axle to control a respective weight of said at least one axle on said rail track for affecting a traction performance of said rail vehicle traveling along said rail track, wherein said force is a normal force applied through said at least one axle in a normal direction to said rail track, and wherein said device is at least one hydraulic actuator coupled to a respective axle of the rail vehicle;

a positive displacement pump coupled to said hydraulic actuator, said positive displacement pump configured to selectively control a position of said hydraulic actuator based upon supplying a pressurized hydraulic fluid at a variable pressure to said hydraulic actuator, said hydraulic actuator configured to selectively impart said force through said respective axle based upon said selectively controlled position of said hydraulic actuator;

a pair of displacement limits coupled to said hydraulic actuator to limit said force selectively imparted on said respective axle;

a compliant member disposed between said hydraulic actuator and said respective axle such that said hydraulic actuator is coupled to said respective axle in a compliant manner; and a suspension assembly mounting said respective axle to a truck, the suspension assembly including one or more springs.

* * * * *

UNITED STATES PATENT AND TRADEMARK OFFICE
CERTIFICATE OF CORRECTION

PATENT NO. : 8,371,233 B2  
APPLICATION NO. : 12/869980  
DATED : February 12, 2013  
INVENTOR(S) : Kumar et al.

Page 1 of 1

It is certified that error appears in the above-identified patent and that said Letters Patent is hereby corrected as shown below:

In the Specifications:

In Column 11, Line 5, delete "322"." and insert -- 322'". --, therefor.

In Column 11, Line 52, delete "326"." and insert -- 326'". --, therefor.

Signed and Sealed this
Fourteenth Day of May, 2013

Teresa Stanek Rea
*Acting Director of the United States Patent and Trademark Office*